Jan. 14, 1947.  G. H. ENNIS  2,414,194
METHOD OF AND APPARATUS FOR LOCATING FORMATIONS IN CASED WELLS
Filed March 31, 1937  5 Sheets-Sheet 1
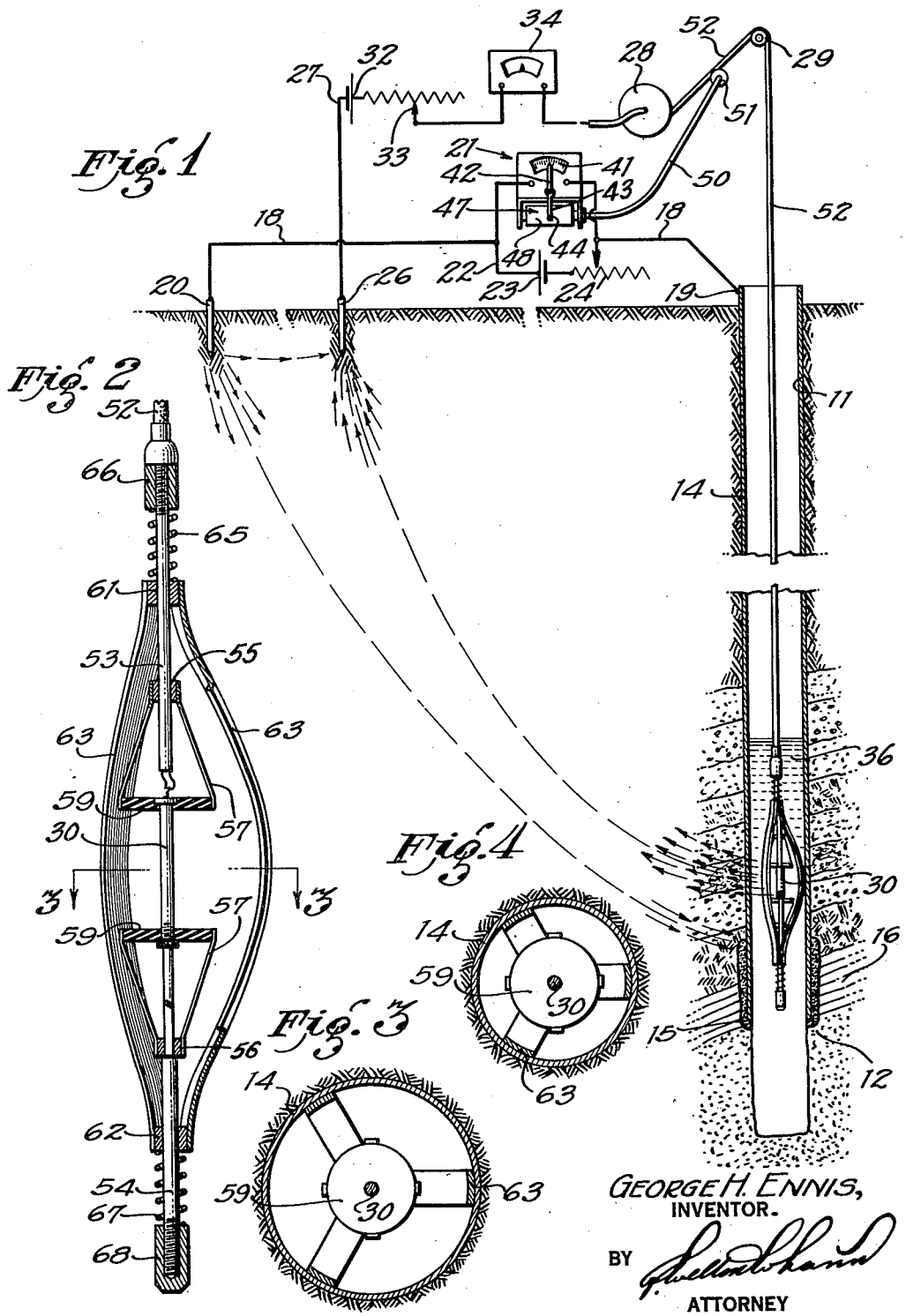
GEORGE H. ENNIS,
INVENTOR.
BY
ATTORNEY Jan. 14, 1947.   G. H. ENNIS   2,414,194
METHOD OF AND APPARATUS FOR LOCATING FORMATIONS IN CASED WELLS
Filed March 31, 1937   5 Sheets-Sheet 3
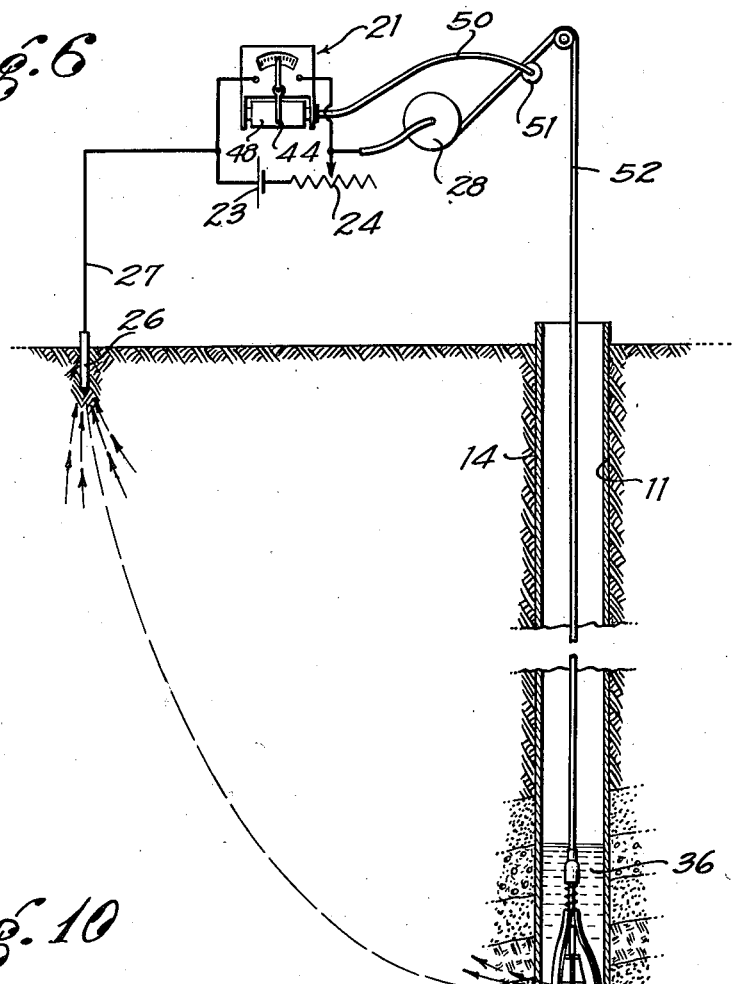
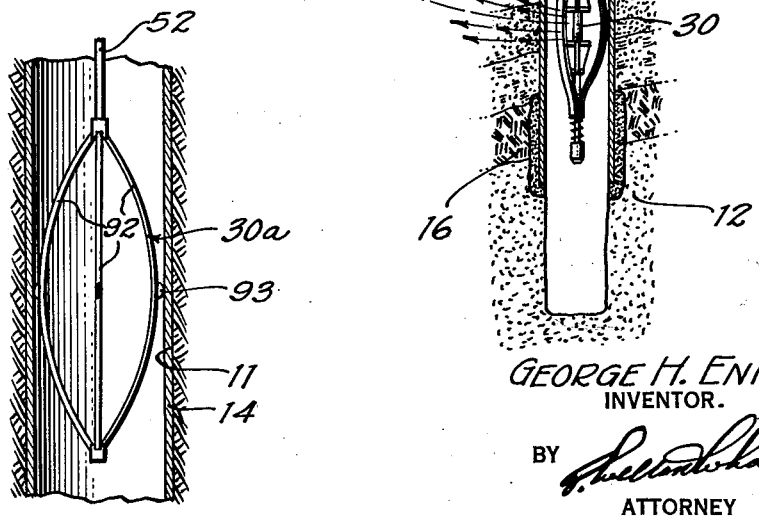
GEORGE H. ENNIS,
INVENTOR.
BY
ATTORNEY Jan. 14, 1947.   G. H. ENNIS   2,414,194
METHOD OF AND APPARATUS FOR LOCATING FORMATIONS IN CASED WELLS
Filed March 31, 1937   5 Sheets-Sheet 4
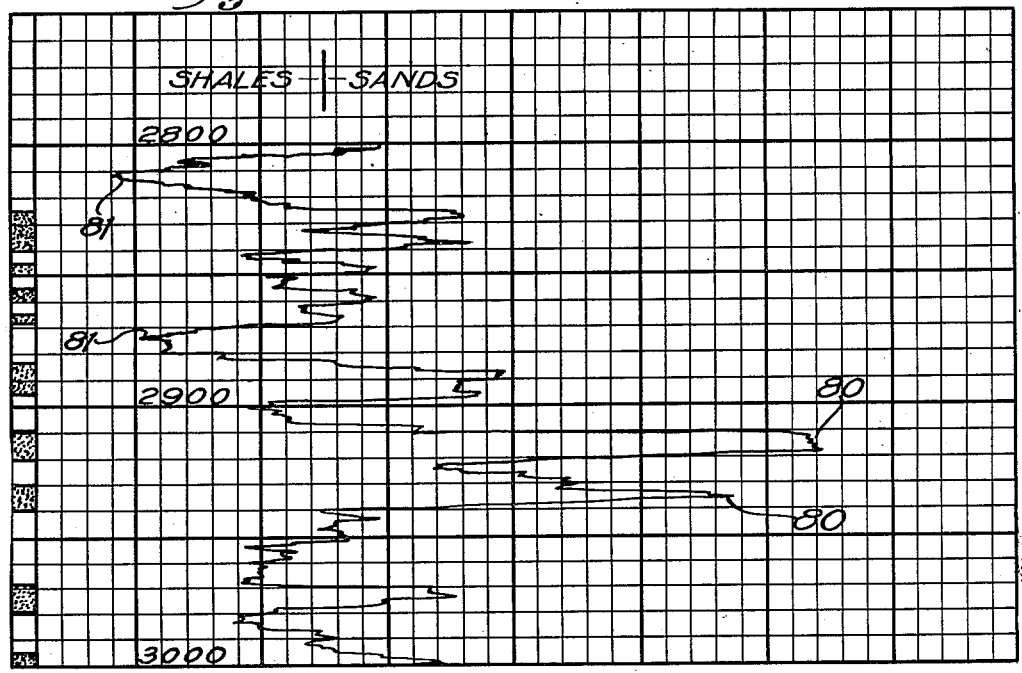
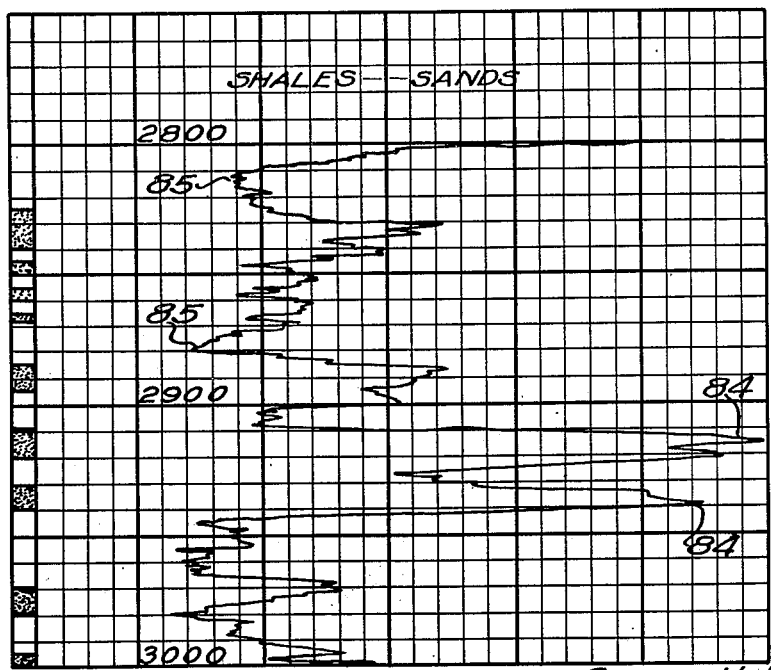
GEORGE H. ENNIS,
INVENTOR.
BY
ATTORNEY

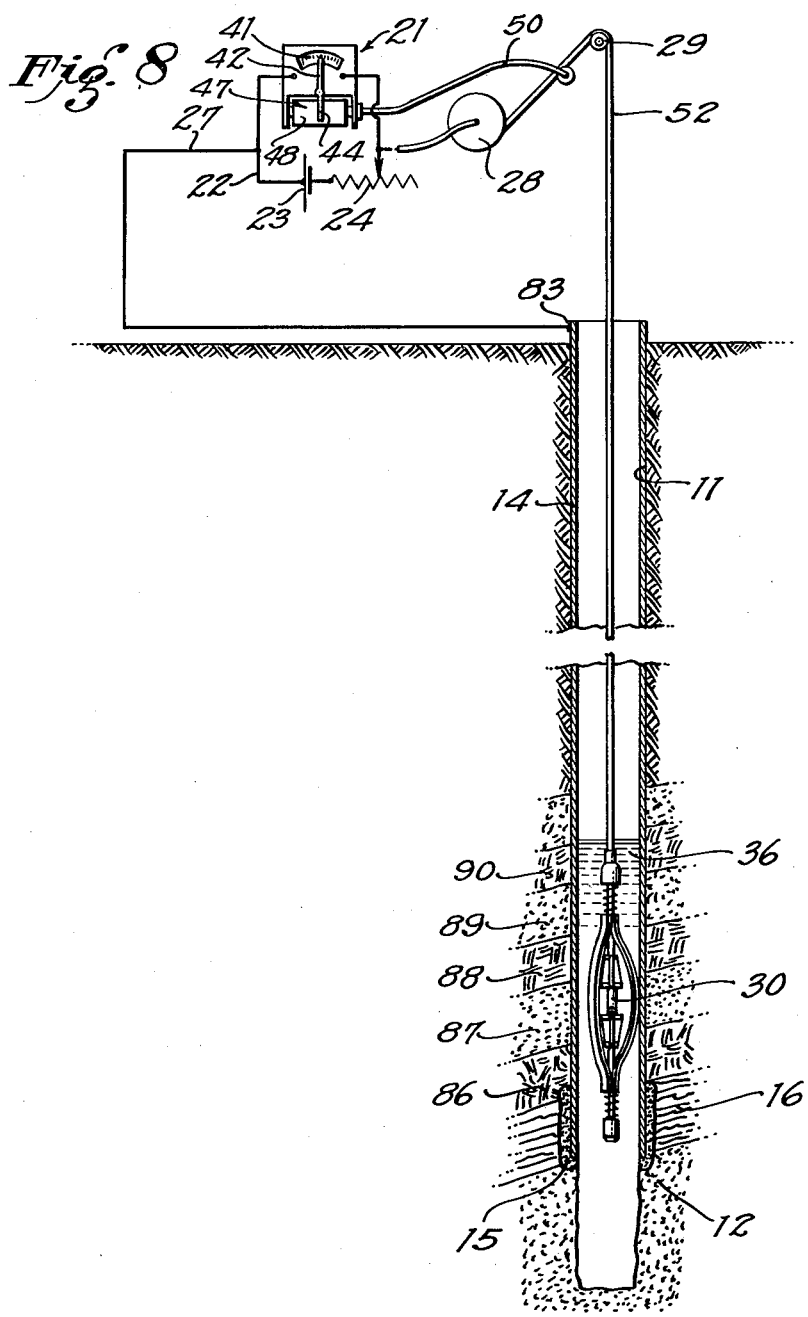

Patented Jan. 14, 1947

2,414,194

UNITED STATES PATENT OFFICE 2,414,194

METHOD OF AND APPARATUS FOR LOCATING FORMATIONS IN CASED WELLS

George H. Ennis, Long Beach, Calif., assignor of one-half to Robert V. Funk, Long Beach, Calif.

Application March 31, 1937, Serial No. 134,049

10 Claims. (Cl. 175—182)

My invention relates to a method of and apparatus for determining the formations and their locations in wells bored in the earth, and in which the well casing has already been installed; and this application is a continuation-in-part of my copending application Serial No. 28,891, issued March 26, 1946, as Patent No. 2,397,254, entitled Method and apparatus for electrically coring in cased bore holes, filed June 28, 1935, and my Patent No. 2,297,754, granted October 6, 1942, for Method of locating strata in wells and electrode apparatus therefor.

In describing and illustrating the various features, advantages, and objects of my invention I will refer to its use in the oil well industry where it is of considerable utility and value. It should be understood, however, that my invention may be used in conjunction with any bore hole or well in which a metal casing or sheath has been installed and in which it is desired to locate the various strata. My invention is new not only in its entirety but also in its several subcombinations, parts of the apparatus, and in the steps of the process which I have developed; and I therefore desire patent protection not only on the method and apparatus as a whole but on the several elements, or parts, or steps which compose the whole.

In practically every oil field there are numerous layers of oil sands or oil bearing formations separated by layers of shale or rock and also separated by water sands. The most productive high pressure oil bearing formations are usually below the more shallow oil sands, and in order to obtain maximum production it is the usual practice to drill through the more shallow oil sands to the high pressure formations. In order to shut off all of the other formations above the one which is being produced, a well casing is installed in the well, this well casing having a shoe on the lower end which is cemented to a shale or rock formation immediately above the formation being produced.

When the high pressure oil bearing formation becomes depleted it is the practice to cement off the depleted formation and to perforate the casing at a point opposite one of the more shallow oil sands to obtain whatever oil is present in such more shallow oil sands. This, of course, can be done only when the location of the more shallow oil sand is known.

Prior to 1927 the only information available pertaining to the location of shales and sands in oil wells was obtained through what was termed a driller's log of the well. This information is unreliable and inefficient due to the fact that it is impossible to determine the character of the formation by the feel of the drill when it is passing through the various kinds of formations. There are many things that can and do enter into the accuracy of the driller's log which, in most cases, is of very little value in determining where shales and oil sands are located.

In 1927 the core barrel was introduced and, at great expense, was run in combination with the oil well drill. It was intended to bring to the surface a core of the formation being penetrated. While this was a great improvement, usually the percentage of core recovery was less than 50%. Furthermore, the cores obtained were often misleading, and, due to great expense, only a small part of the hole was cored in the zone that immediate production was expected, and no great amount of information was obtained.

It will be seen, therefore, that there are a large number of wells in different established oil fields in which there is little or no information on the locations of oil sands and shales or their elevation at the point penetrated by such wells.

I have invented a method and apparatus which may be used on wells in which the well casing has been installed for determining the locations of the strata between the lower end of the casing and the surface of the ground. In using my invention it is possible to obtain information by which the location of the various shales and sands may be located, and with this information it is possible to perforate the well casing at such a point that oil sands will be communicated with the well and the well put on production.

It is an object of my invention to provide an electrical or electro-chemical method of and apparatus for locating sands and shales in a well in which a casing member has already been installed.

It is a further object of my invention to provide a method and apparatus of this character which involves absolutely no mathematical computations or calculations to obtain or use the information which is given in the performance of my invention.

It is another object of my invention to provide a method and apparatus in which the apparatus during the performance of the method produces a chart which of itself, and without mathematical computations, indicates the locations of sands and shales.

When a casing member is placed in a bore hole or well there is an electrical, electro-chemical, electro-thermal or electro-kinetic phenomenon in the formations adjacent the casing member, and between the casing member and the formation or formations. I have discovered that by forming an electrical circuit which includes an electrode within the casing member, the electrical, electro-chemical, electro-thermal or electro-kinetic phenomena which take place in the formations and between the formations and casing member, at an elevation adjacent the electrode, affect the electrical values or electrical characteristics in the circuit. By moving the electrode to different levels in the well changes in electrical values or electrical characteristics in the electrical circuit occur which I have been able to prove by actual demonstration faithfully indicate the different strata lying in back of the casing member.

It is an object of my invention to provide a method and apparatus for locating strata in a well in which a casing member has been placed, in which an electrical circuit including an electrode situated within the casing member is provided, in which the electrode is moved to different elevations in the casing member, and in which the effects of the electrical, or electro-chemical, electro-thermal or electro-kinetic phenomena in the formations or between the formations and the casing member adjacent the electrode on the electrical values or electrical characteristics are indicated, measured, or determined.

It is a further object of my invention to provide a method and apparatus for locating strata in a well in which the casing member which is placed in the well and an electrode installed in the earth a distance from the well, and also the intervening earth, are employed as an E. M. F. cell or, more broadly speaking, as an E. M. F. source or as an energy source, and in which the electrode is electrically connected to different portions of the casing member externally of the earth to complete the electrical circuit including the E. M. F. source, and in which changes in voltage, amperage, or other electrical phenomena or electrical characteristics are indicated, measured, or determined. It has been found that electrical characteristics change as the connection with the casing member is changed, with the result that a curve may be plotted having peaks, which peaks indicate certain formations.

It is a still further object to provide a method and apparatus for locating strata in which two E. M. F. cells or sources are formed, one source being formed by the casing member and electrode installed in the earth and the intervening earth, and the other E. M. F. source being formed by an electrode placed in the well, the casing member, and the liquid between the casing member and the well electrode, in which the ground electrode and well electrode are connected together, and in which the changes in electrical characteristics which occur when the well electrode is moved along the well are indicated, measured, or determined.

It is a still further object of my invention to provide a method and apparatus in which an earth electrode is installed in the earth a distance from the well and is electrically connected to different portions of the casing member so that the current flow between the earth electrode and the different portions of the casing member may be indicated, measured, or determined.

It is a still further object of my invention to provide a method and apparatus in which an earth electrode is installed in the earth a distance from the well and is electrically connected to different portions of the casing member so that the potential difference between the earth electrode and the different portions of the casing member may be indicated, measured, or determined.

It is a still further object of my invention to provide a method and an apparatus in which an earth electrode is installed in the earth a distance from the well and is electrically connected to different portions of the casing member so that the electrical values which exist in the electrical circuit at different places of connection to the casing member may be indicated, measured, or determined.

It is another object of my invention to provide a method and apparatus in which an electrical circuit is formed which includes an electrode movable within the casing member of the well and which is connected by an electrical conductor to the casing member at a location spaced from the movable electrode; and in which the electrode is moved within the casing member and the electrical values in the electrical circuit are measured for different positions of the electrode within the casing member.

In electrical or electro-chemical methods of my invention, the values measured or recorded in making the tests are sometimes very small and the deviations in values which are relied on to indicate the location of the different strata are often minute in character. In view of these facts it is highly important that the fixed values in the method do not fluctuate, otherwise false indications and erroneous determinations will occur.

An object of my present invention is to provide a method of testing wells in which an electrode is connected to a testing circuit and lowered into the casing member of the well, and values in the testing circuit measured, and in which the electrical or electro-chemical values between the electrode in the well and the casing member are maintained uniform and in which fluctuations are produced by the influence of the formations.

Most oil wells are not drilled straight due to inability of the well drilling apparatus to drill a straight hole and the axis or contour thereof is crooked. These deviations from vertical are very often in different directions, and therefore the axis or contour of the well will zig-zag back and forth.

It is an object of my invention to provide a method of testing wells, as pointed out heretofore, in which the electrode which is moved in the well is maintained in uniform relationship to the casing member of the well to which, or through which, the test is being made, and in which the electrode is maintained in a uniform relationship to the axis or contour of the well when it is moved into various positions along the casing member.

Another object of my invention is to provide a method in which the movable electrode is maintained substantially concentric to and in alignment with the axis of the well at all positions into which it is moved along the well.

In one of the methods of my invention the casing member in the well, the liquid in the well, and the movable electrode constitute a voltaic cell for producing an electro-motive force or current flow at the place occupied by the movable electrode. For obtaining accurate determinations, it is necessary that the values of this voltaic cell be maintained constant.

It is an object of my invention to provide a method as pointed out in which the voltaic cell formed in the well, and including the movable electrode which constitutes a plate of the voltaic cell, has its values maintained substantially constant or uniform at all positions of the movable electrode along the well.

My invention is susceptible of embodiment in many different forms, all of which incorporate the essential features of my invention. It is found in practice that certain wells may advantageously employ a slightly different set-up of apparatus. However, in each instance the apparatus incorporates the essential and fundamental elements of my invention.

In the following description I will describe in detail the apparatus which I have found through experimenting and tests to be most successful of general application, and during the course of the description will point out the various additional features and advantages and objects of the invention in addition to those which I have set forth heretofore; and I will also describe other forms of my invention which have been tested and used on various wells and which have certain features and advantages which will also be pointed out in the description.

Referring to the drawings:

Fig. 1 is a diagrammatic view illustrating apparatus of my invention, and which performs the method of my invention, which has proven highly successful in commercial use.

Fig. 2 is a vertical sectional view of the electrode device employed in the apparatus shown in Fig. 1.

Fig. 3 is a section taken on the line 3—3 of Fig. 2.

Fig. 4 is a section corresponding to Fig. 3 but showing the positions of the parts in a smaller diameter of well.

Fig. 6 is a diagrammatic view illustrating another apparatus incorporating the features of my invention, and which performs the method of my invention, and which has also been extensively used.

Fig. 7 is a view showing a record or chart which was made in an oil well at Signal Hill, California, with apparatus like that shown in Fig. 6.

Fig. 8 is a diagrammatic view illustrating a further modification incorporating certain features of my invention.

Fig. 9 is a view showing a record or chart made in an oil well by apparatus shown in Fig. 8.

Fig. 10 is a fragmentary view illustrating an alternative form of well electrode which may be used in conjunction with the apparatus of my invention in place of the electrode apparatus shown in Fig. 2.

Figure 5:
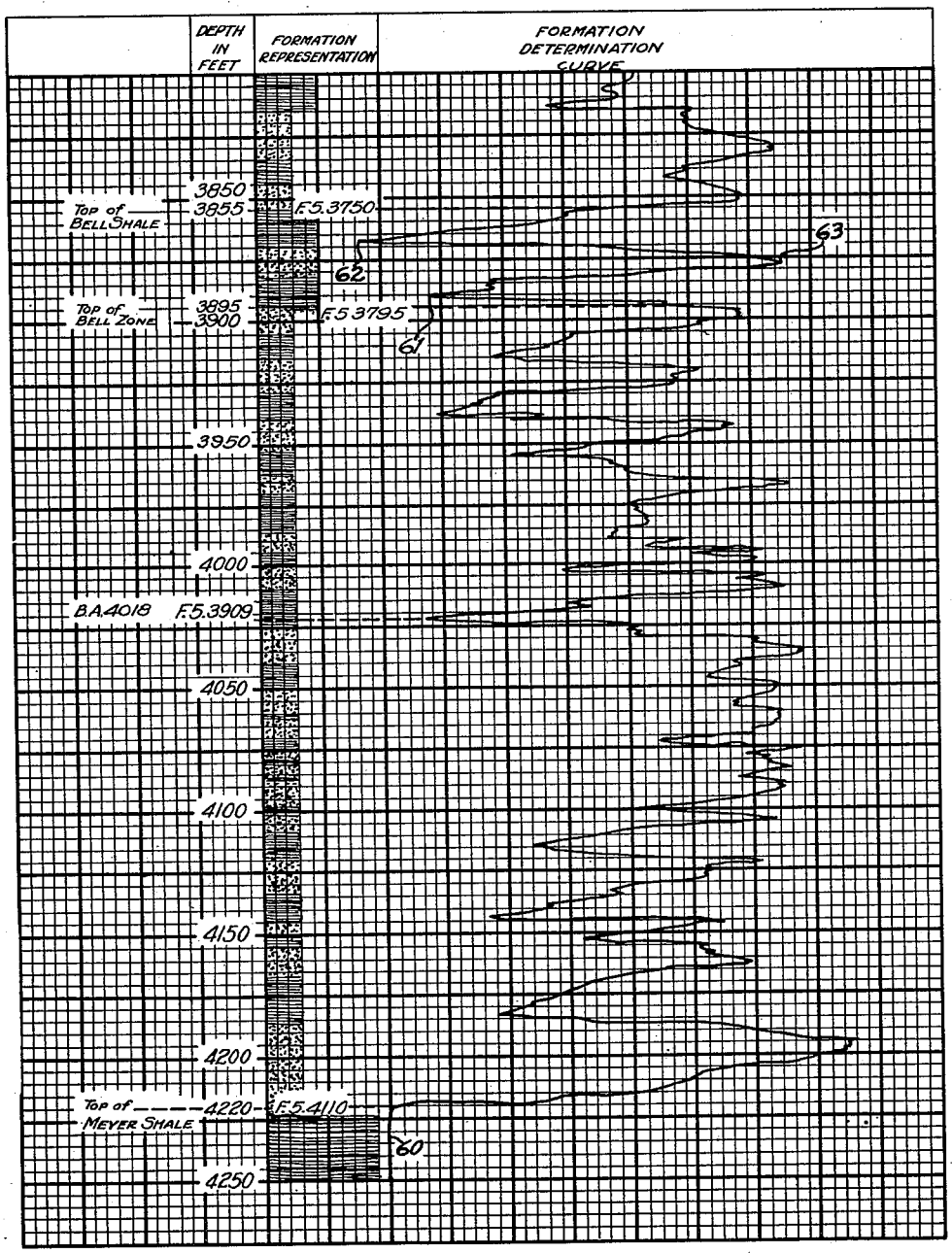
Fig. 5 is a view showing a record or chart which was made by apparatus corresponding to that diagrammatically illustrated in Fig. 1 and which was used for locating the oil bearing strata in Union Oil Company of California well, Farwell No. 4, located at Santa Fe Springs, California.

Referring now to the drawings in detail, I will describe the apparatus disclosed in Figs. 1 to 4 inclusive. In Fig. 1 the numeral 11 represents a well which has been drilled to an oil bearing formation 12 and in which a well casing 14 has been installed and cemented to a layer of rock or shale 16 in order to seal from the well all of the oil or water bearing formations above the shale 16.

The apparatus of the form of my invention disclosed in Fig. 1 includes a conductor 18 which is connected to the well casing 14, as indicated at 19, and which is connected to a ground 20 which is placed in the earth a distance from the well. This conductor 18 and associated parts constitute an external well circuit of my invention, and through which an external flow of current may be established. Included in the conductor 18 is a recording device 21, and also there is a balancing or shunt circuit 22 having a battery or other source of energy 23 and an adjustable resistance 24. Any other balancing means, such, for example, as a potentiometer, may be employed. The recording means 21 may be a simple form of meter adapted to indicate milliamperes or millivolts or other electrical values or characteristics, or may be one which forms a graph or chart like that illustrated in Fig. 5. The latter type is preferred and is illustrated herein, and includes a face 41 and a pointer 42 which may be connected with internal mechanism of the recording means. Extending from the pointer and movable therewith is an arm 43 which carried a stylus 44 adapted to record a curve on a sheet of graph paper carried by a drum 47. The drum 47 is rotated by a flexible shaft 50, which flexible shaft 50 is driven by a sheave 51, which sheave is in turn rotated by a cable 52 which extends into the well, and by this means the drum is moved in accordance with the position of certain apparatus employed in making the test so that the curve produced will be calibrated as to depth. Additional details of this will be given in describing the other parts of the apparatus.

Placed in the earth a distance from the well is a ground 26 to which a conductor 27 is connected. This conductor 27 and its associated parts constitute an external well circuit of this form of my invention. The conductor 27 is connected to the end of the cable 52 which is wound on a drum 28 and extends through the cable 52 and is connected to an electrode 30 which forms a part of the electrode apparatus of my invention. The cable 52, as shown, extends over a sheave 29 positioned above the upper end of the well 11. The conductor 27 includes a recording or indicating means or meter 34 which measures electrical values or characteristics in the conductor 27 and may be either a milliammeter or millivoltmeter. The conductor 27 may also include a source of energy in the form of a battery 32 and a variable resistance 33.

In the form of my invention illustrated in Fig. 1, the well 11 is shown as containing an electrolyte 36, such as salt water, fresh water, or rotary mud ordinarily found in a well, or a special electrolyte which may be placed in the well as needed. The term "electrolyte" as used herein is used in its broad sense to include fluids which give evidence of electrolytic conductance. The electrode 30 is preferably of the type to form the plate of a voltaic cell so that the well casing 14 which may constitute the wall of the well, the electrolyte 36, and the electrode 30 constitute a voltaic or E. M. F. cell or a source of energy.

The electrode apparatus which I utilize in the form of my invention disclosed in Fig. 1 is shown in detail in Figs. 2 to 4 inclusive. The lower end of the cable 52 is connected to the electrode apparatus, and the conductor 27 covered by a suitable insulation is electrically connected to the electrode 30. The apparatus includes an upper shaft 53, a lower shaft 54, and interconnecting supporting means in the form of an upper plate 55, a lower plate 56, and four interconnecting supporting arms 57. Secured to the supporting arms 57 are plates 59 which support the electrode 30. Slidably mounted on the shafts 53 and 54 are hubs 61 and 62 to which centralizing arms 63 are connected. These centralizing arms 63 are flexible and may bow outwardly or be forced inwardly so that they will engage the wall of the well casing and thus maintain the electrode 30 in an exactly concentric position in the well casing. For the purpose of assuring an expansion of the arms 63 an upper spring 65 is compressed between the hub 61 and a shoulder 66, and a lower spring 67 is compressed between the hub 62 and a shoulder 68. With this mechanism the electrode 30 will always be maintained in a uniform position with respect to the wall of the well and with respect to the axis or contour of the well. As will be pointed out hereinafter, the maintaining of this definite relationship of the electrode 30 and casing member 14 is highly important to the obtaining of accurate determinations. As shown in Fig. 4, if the well is of smaller diameter than that shown in Fig. 3, the arms 63 will be collapsed, this resulting in the hubs 61 and 62 moving upwardly and downwardly in opposite directions, but it will be seen that the electrode 30 is maintained in its central predetermined position.

The form of apparatus disclosed in Fig. 1 constitutes one which I have found to be very satisfactory in locating formations in a well. In the apparatus of Fig. 1 the electrode 26 is preferably located a distance of about 125 feet from the well 11 and the electrode 20 is located at a distance of about 125 feet from the electrode 26 and 250 feet from the well 11. It is conducive to more distinct recording to locate these two grounds 20 and 26 at such points that there will be a minimum of electrical interference to the flows of currents and the voltages in the circuits, and this should be done even though it is necessary, for example, to place the two grounds 20 and 26 closer together or to place them closer or farther from the well 11. For example, I have found it desirable to keep these two grounds away from any surface piping which forms conductors and which in an oil field would ultimately lead to the well being tested.

There is a potential difference between the electrodes and well casing due to electrical or electro-chemical phenomena, and when an electrical connection is made externally of the earth there will be a current flow from the high potential to the low potential electrode. In using the form of my invention which employs batteries, such as 32, for assisting in producing voltages or current flows of sufficient magnitude to give intelligent indications, I find it more satisfactory to arrange the apparatus so that the flow of current through the external circuit is in harmony with rather than in opposition to the currents generated in the earth, and which may be generally designated as internal circuits or current flows as distinguished from external circuits or external current flows. In fact, in this apparatus I find it advantageous to use the internal flows of current or potential in its operation.

Since the well casing 14 has already been installed in the well and is made from iron, it is desirable in order to augment the electrical or electro-chemical action to form all of the other electrodes and grounds such as 20, 26, and 30 of opposite electro-potentials so that, as pointed out heretofore, more pronounced flows of current and potential differences between the electrodes and casing will be produced.

The well casing 14, the electrode 30, and the electrolyte 36 constitute a voltaic or E. M. F. cell or, more broadly speaking, an E. M. F. source or energy souce and produce an electrical potential and electrical current which flow through the external well circuit and also through the ground which forms a part of the internal well circuit. It is, therefore, desirable to form the electrode 30 from a metal which is electro-positive with respect to the iron casing 14 such, for example, as zinc. The ground 26, the casing 14, and intervening earth may also constitute an E. M. F. cell or, more broadly speaking, an E. M. F. source or energy source and it is, therefore, desirable to form the ground or electrode 26 from a metal which is electro-negative with respect to the iron casing 14 so that the two sources may work together, and therefore this ground 26 may be made from any of a number of metals such as nickel, lead, tin, copper, silver, antimony, or gold. With this arrangement two adjacent cells are formed which have a common metal junction in the casing 14; or where there are a number of casing members in the well, the junction consists of the casing members and intervening fluid or mud.

With the electrodes so formed when the well circuit, including the external well circuit and the internal well circuit, is completed there will be a flow of current from the electrode 30 through the electrolyte 36 to the casing 14, from the casing 14 to the ground 26, and from the ground 26 through the conductor 27 through the various apparatus, and from thence into the well to the electrode 30. It should be strictly understood, however, that this direction of flow is not essential but merely desirable. It would be possible to reverse the direction of flow by either changing the electro-potentials of the electrodes 26 and 30 of this circuit or by providing a source of energy in the conductor 27 greater than that generated in the earth and in opposition thereto which would cause a flow of current in the direction reverse to that just described.

In the casing circuit which includes the external and the internal circuits, the casing 14 and the ground 20 constitute electrodes of an E. M. F. cell or an E. M. F. source or energy source, and it is preferable to make the ground or electrode 20 from a metal which is electro-positive with respect to the iron casing 14 and metals such, for example, as zinc may be used. A further reason for making the ground 20 electro-positive is that the ground 20 is electro-negative with the result that there is a potential difference between the ground 20 and the ground 26 which produces an additional flow of current which has been found to be of value in obtaining readings from the recording device 21 which are very distinct in character and which very clearly show up the different formations in the well. The flow of current in the casing circuit, both external and internal, is as follows. The electricity flows from the electrode 20 through the earth to the casing 14 and from the upper end of the casing through the conductor 18 to the ground 20. There is also a flow of current from the ground 20 through the earth to the ground 26 and this current flows through the conductor 27 in the same direction as the flow of current previously described with respect to the well circuit. As is true in connection with the well circuit, it is possible in the casing circuit to make the electrode 20 electro-negative with respect to the casing 14 and to produce a flow of current in the opposite direction.

Although better results are obtained in this form of my invention when the flows of current are in the direction indicated in Fig. 1, satisfactory readings may be obtained by reversing either or both of the current flows.

It is possible in this form of my invention to place the recording device 21 in the well circuit and to obtain a record which will indicate the location of the sands and shale. However, it is found where both circuits are employed, as in this form of my invention, more distinct curves are obtained by placing the recording meter 21 in the casing circuit, and therefore I prefer to place the recording device 21 in the casing circuit.

I will now refer to Fig. 1 and describe one method which may be followed in installing the apparatus of my invention shown therein and the method in which the record, as illustrated in Fig. 5, is obtained.

When it is desired to make a test and determination of the sands and shales in a well, I first install the grounds 20 and 26 in the locations shown in Fig. 1, the ground 26 being 125 feet, more or less, from the well, and the ground 20 being 250 feet, more or less, from the well. The two circuits are then connected to the grounds and casing and the electrode 30 is lowered into the well to a point opposite a particular shale or other known formation in the well. In the particular well illustrated the shale 16 is the one in which the shoe has been installed and is one which is known in the fields as being a particular body of shale. It sometimes happens that there is a particular oil sand in a well which is well established in the geological records for the particular field in which the well is situated, and therefore the electrode under such circumstances would be lowered to a point where the oil sand is located. The meter 34 is then observed and if the current flow is not 860 millivolts plus or minus 150 millivolts, the resistance 33 is operated either to increase or decrease the resistance in order to bring the reading to approximately 860 millivolts. The flow of current from the ground 20 to the casing 19 is then observed, this being done by disconnecting the shunt circuit 22. This voltage should be approximately 380 millivolts but may vary plus or minus 100 millivolts. If the millivoltage of this circuit is not within the range, it may be desirable to insert an artificial source of energy in the conductor 18, such as a battery, in order to increase this voltage. However, it is found that ordinarily this flow of current will be adequate without any batteries inserted in the conductor 18. It is only where the casing 14 is so old and corroded that there is very little chemical action that it is necessary to use a battery in the casing circuit. If the voltage is too high, resistance may be inserted to decrease it. The next determination which is made is the potential difference between the grounds 20 and 26. This should be approximately 970 millivolts with the ground 26 positive in the external circuit. If this voltage is not within 150 millivolts of this figure, the distance between the ground 20 and 26 is then changed until the desired voltage between these two grounds is obtained.

The potential differences which have been pointed out have been determined through considerable experimentation as being productive of the best results. It should be strictly understood that the invention is not to be limited to these potential differences or corresponding current flows in various circuits, since records can be obtained using other voltages, currents, and other relationships between the various circuits. However, conditions may exist in which it would be desirable to use other potentials, currents, and other relationships of the parts.

I have given the voltages, spacing of the parts, and relationship of the parts which I have found to be the most efficient in actual practice not to place limitations on the invention but solely in order that this specification may teach those skilled in the art of the manner in which I believe to be the best mode of practicing my present invention.

After the parts have been so positioned and the voltages adjusted as pointed out heretofore, the next step is to balance or adjust the voltage in the external casing circuit in order that the chart produced on the graph paper 48 will be in a centralized position. The shunt circuit 22 is therefore connected and the resistance 24 is adjusted so that the stylus 44 is set in a desired position on the graph paper 48. The apparatus is now ready for making the record which is done by winding up the drum 28 very slowly and raising the electrode 30. As the drum 28 is wound up the small drum 47 carrying the graph paper 48 is rotated in accordance therewith. Furthermore, as the electrode 30 is raised there will be a fluctuation in the flow of current through the casing circuit and through the conductor 18 with the result that the meter 21 will be operated in accordance therewith which will move the pointer 42 and the arm 43 and will cause the stylus to move to the right or left relative to the graph paper 48. When the top of the well is reached the graph paper 48 may be removed from the drum 47 and it will be found that a line has been placed thereon as shown in Fig. 5, and from this chart it is possible to locate shale and sand formations, as will be pointed out shortly.

When the apparatus is set up and in operation, as previously described, there is a flow of current through the conductor 27 from the ground 26 to the electrode 30, and to complete the circuit there is a flow of current from the electrode 30 to the casing member 14, and through the earth to the ground 26. There is also a flow of current through the conductor 18 from the top of the casing 14 to the ground 20, and this electrical circuit is completed by a flow of current from the ground 20 through the earth to the casing 14. I have furthermore determined that there is a flow of current through the earth from the ground 20 to the ground 26, this being determined by making a test in the external circuit. I therefore believe that in the performance of this form of my invention there are at least three flows of currents in the ground. There is one flow of current from the electrode 30 to the casing 14 and to the ground 26; there is another flow of current from the ground 20 to the casing 14; and there is a third flow of current from the ground 20 to the ground 26.

When the electrode 30 is in different positions in the well the electrical characteristics or electrical values (which term I use to broadly identify either a change in voltage, amperes, or other electrical phenomena) in both of the conductors 18 and 27 change, and there is a definite cause and effect relationship between the current flows or voltages of the two conductors. It appears that whenever the electrode 30 is opposite a shale there are certain electrical characteristics in the conductors 18 and 27, and that when the electrode 30 is opposite a sand there are certain other electrical characteristics in the conductors 18 and 27. Experience has indicated that these different electrical characteristics accurately indicate the type of formation which is directly adjacent the electrode 30 and this holds true with such accuracy that I am able to obtain a record, as shown in Fig. 5, which can be used by geologists to locate oil bearing sands and to therefore find the level at which the casing 14 should be perforated in order to obtain oil.

I am not certain as to just how the formation adjacent the electrode 30 varies or affects the electrical flows or voltages in the conductors 18 and 27, but I believe that it influences these current flows or voltages because of the difference in physical, electrical, or electro-chemical, or electro-thermal, or electro-kinetic properties of the different types of formations and because of the action which occurs between the casing and formations. It is, of course, well known that batteries or voltaic or E. M. F. cells have internal resistance. In the ground the casing 14 acts as one plate, while the grounds 20 and 26 act as other plates of the battery. The intervening earth constitutes an electrolyte and there is a chemical action between these two elements. The point at which the electrical flow passes to or the voltage is impressed on the casing 14 is determined by the position of the electrode 30, which in turn determines the formation through which the current must flow into the surrounding earth or determines the formation which will have its effect on the external flows of current or potential differences between the electrodes. Since (it is believed) the electrical flow diverges and spreads quite rapidly after it enters the earth, the physical, electrical, or electro-chemical, or electro-kinetic properties of the material located immediately adjacent the electrode 30 may affect the current flows or voltages in the conductors 18 and 27, even though this material with the electrodes also acts as a battery in generating a current through the earth. It is important in the method of my invention that the only variable be that produced by the effect of the stratum which is located directly opposite the electrode 30. All other values must remain fixed, since it is the purpose of the method to locate the depth at which the various strata occur in the well.

In the practice of my invention I maintain the values of the voltaic or E. M. F. cell or source in the well substantially uniform by maintaining the electrode 30 in a uniform position relative to the wall of the well through which the test is made. It will be seen from Figs. 3 and 4 that regardless of well diameter the electrode 30 will be maintained in a central position and be caused to follow the axis or contour of the well. This is highly desirable also from the standpoint of resistance. If this distance were to vary, the resistance in the well circuit would change, which obviously would cause a fluctuation of the recording means which would not be caused by the adjacent formation. The changes in resistance due to a change in electrode concentricity are quite substantial when it is remembered that the current flows or voltages which are measured may be quite small. It will be seen, therefore, that the E. M. F. of the source within the casing member is constant, while the E. M. F. of the source outside the casing member may vary (in practice it varies from 3% to 15%), and that it is this variance which produces the fluctuations on the indicator.

Referring now to Fig. 5, I have illustrated a graph which is produced by the recording device 21 of my invention. This graph or chart is a reproduction of a portion of a chart from 3800 feet down to 4250 feet in the Union Oil Company well, Farwell No. 4, located at Santa Fe Springs, California. In this well the shoe 15 of the casing 14 was set at 4250 feet in a substantial shale in the oil field which is known as the Meyer shale. When the apparatus was first installed in the well the voltage in the casing circuit 18 was adjusted so that the shale was indicated by the peak 60. At a level of 3855 feet to 3895 feet a shale known as the Bell shale was located. This shale is a well established marker in this field and was identified because of its size and because it has a layer of sand in it. This Bell shale is indicated on the chart by the two peaks 61 and 62 separated by the peak 63 which indicate the area of sand in this Bell shale. All of the shales, oil sands, limestone, shaly sands, sandy shales and other formations having different electrical characteristics between the Meyer shale and the Bell shale are indicated and located by the peaks to the left and the peaks to the right and of different magnitude and shape. In a well located near Farwell No. 4, and which is known as Farwell No. 5, the top of the Bell shale was located at 3750 feet and the bottom of the Bell shale was located at 3795 feet. This, therefore, indicated the slant of the Bell shale formation between these two wells. In Farwell No. 4 in which the record Fig. 5 was made, the top of the Meyer shale was 4220 feet, while in the adjacent well, Farwell No. 5, the top of the Meyer shale was 4110 feet below the surface of the ground. This, therefore, enabled a determination of the inclination of the Meyer shale.

As pointed out heretofore, in the method and apparatus of my invention the record made by the recording device 21 is a complete and final record which may be used for determining where the well casing should be perforated. It is not necessary to make any mathematical computation or calculation in order to locate the various shale or sand. All that is necessary is to remove the record 48 and to examine the lines drawn thereon by the stylus. In view of the correlation between the position of the drum and the position of the electrode 30 the depth below the surface of the ground of each of the peaks in either direction is indicated directly on the chart.

In Fig. 6 I have illustrated an apparatus of my invention which incorporates the basic principles of that disclosed in Fig. 1, and which performs a method incorporating the basic principles of my invention. It has been found that in many wells the invention can be practiced without the use of the casing circuit, and Fig. 6 illustrates such an apparatus. In the form of my invention illustrated in Fig. 6 the recording device 21 is placed in the well circuit and is connected in the conductor 27 as shown. As in the form of my invention heretofore described, the formations directly adjacent the well and opposite the electrode 30 affect the electrical values in the conductor 27 which may be recorded or indicated on the meter 21 and a graph produced. As in the prior form of my invention, a potential difference is established between the electrode 30 and the casing 14 due to the electrolytic action of the fluid 36, and this results in an ionic flow from the electrode to the casing. This in turn causes an electronic flow through the casing directly opposite the electrode, continuing the action by an ionic flow from the casing into the stratum at this point, and completing the circuit by an electronic flow to the ground 26 at the surface of the ground. The characteristics of the formation adjacent the bore hole determine one or more of several electro-chemical or electro-thermal or electro-kinetic phenomena or other phenomena which occur and which affect the flow of current or potential difference and thus produce fluctuations in the electrical values which are recorded, measured, or indicated.

In Fig. 7 I have illustrated a curve made by the use of apparatus as shown in Fig. 6 in actual use in a well in which oil sands and shales were located. It will be seen in Fig. 7 that two very prominent peaks 80 indicate clear sand formations, while peaks 81 in the opposite direction give shale indications. The intermediate peaks of less magnitude also indicate other formations.

It will be seen that the apparatus disclosed in Fig. 6 and method performed thereby employ the basic principle of my invention which resides in the use of the casing member 14 and ground 26 as the electrodes of an E. M. F. cell and all or part of the intervening earth as the electrolyte, or, more broadly speaking, employs the casing 14, the ground 26, and the intervening earth as an E. M. F. source or energy source and in the electrically connecting of the ground 26 to the casing 14 at different elevations through the medium of raising or lowering the electrode 30 into different elevational positions inside the well casing. If desired, a source of voltage or amperage such as a battery and rheostat means may be employed in the circuit as in Fig. 1. As stated heretofore, in many wells readings may be obtained without the use of the casing circuit shown in Fig. 1, and that circuit may be dispensed with. Consequently, I desire my invention to be broadly construed to cover in its broadest aspect and equivalency the combination which I have produced and desire the method to be broadly construed as covering the steps in their broadest aspect.

In Fig. 8 I have illustrated another form of my invention which employs the well circuit which may, if desired, include a battery. In this form of my invention the conductor 27 instead of being connected to the ground 26 spaced from the well is connected to the casing member 14 by the ground 83. I have found that in using this type of apparatus a curve, as shown in Fig. 9, may be obtained which indicates sands, such as are noted by the peaks 84, and shales, as indicated by the peaks 85. In the formations lying adjacent to the casing 14, and which I have illustrated at 86, 87, 88, 89, and 90, various electro-chemical or electro-thermal or electro-kinetic phenomena occur both with respect to the formations themselves and between the formations and the well casing. Potential differences are established and electrical values thus produced in the vicinity of the electrode 30 are recorded on the meter 21, and the curve, as illustrated in Fig. 9, which represents an actual well test may be obtained. As an illustration of electrical values or electro-chemical values which occur, if there is a flow of fluid in any of the formations an ionic flow is produced in the same direction as the movement of the fluid. The E. M. F. produced is directly proportional to the pressure and also to the porosity of the sands and viscosity of the fluid. Also where the hydrostatic heads of the different formations are different, different potentials will be produced in the formations. The phase boundary potentials produced by the difference in concentration of electrolytes coming into contact at the intersection of sands, clays, and shales, such as indicated by the numerals 86 to 90 inclusive, also the potential difference existing across the different layers irrespective of the fluid they contain and the electrical conductance of the solutions, constitute other electrical, electro-thermal, electro-kinetic or electro-chemical characteristics which are recorded in the well circuit as shown in Fig. 8. In addition to this action there is, of course, the chemical action between the casing and the formations which also affect the reading on the meter 21. One formation may be electro-positive with respect to the casing, while the adjacent formation may be electro-negative. This produces potential differences and current flows and opposing relationships, and the fluctuations produced in the well circuit are clearly indicated on the meter 21 and may be recorded on the graph 48.

In Fig. 10 I have illustrated an alternative form of electrode 30a which may be employed in place of the electrode 30 shown in Figs. 1 to 3, 6, and 8. In this form of my invention the electrode 30a is suspended on the cable 52 and is well adapted to use in wells where the fluid level is so low that there can be no electrolyte maintained in the well or, if desired, may be used even though there is an electrolyte in the well. The electrode 30a includes a plurality of spring arms 92 which are provided with contact edges 93 so that good electrical contact may be made with the casing 14. When this type of electrode is used there will, of course, be no E. M. F. source provided in the well, and therefore, unless it is desired to employ a battery, such as the battery 32 shown in Fig. 1, the current flows and potential differences will be produced solely by the electrical, electrolytic, electro-thermal, electro-kinetic or electro-chemical action which is produced in the formations or between the formations and the casing.

As stated heretofore, I do not wish my invention to be limited to details or steps which, although they may be of benefit, may be changed or eliminated. During the course of the preceding description I have inserted explanations and broadening statements with the view of defining the true breadth of my invention, but my failure to do so in any particular respect is not to be construed as a disclaimer of any rights which I may be entitled to over the prior art.

The well casing 14 may be a special casing member or pipe installed especially for the purpose of acting as an electrode for the purpose of making the test and could thereafter be removed from the well. The term "well casing" or "casing member" therefore refers to a member which is either permanently or temporarily placed in the well.

The indicator or recorder which I prefer to use in the practice of my invention is a millivoltmeter which measures the voltages and changes in voltages which occur when the electrode 30 is moved into different positions in the well. However, amperes or current flow, resistance, or other electrical values may be measured. Likewise, the electrical values of these different types which are produced in the external circuits may be produced as a result of or may be affected by the current flow, voltage, resistance, impedance, condenser effect, etc., in the formation along side of the electrode 30 or the formations adjacent thereto. Obviously, my invention is not limited to the indicating, recording, or determining of any particular type of electrical values which is produced during the performance of the method of my invention, and therefore I employ the term "electrical characteristics" as inclusive of these different electrical values which exist or may be measured. The term "electrical characteristics" therefore is intended to include voltage, amperage, resistance, impedance, condenser values, or other electrical phenomena which may be measured, indicated, recorded, or determined in order to obtain information whereby a curve, such as shown in Figs. 5, 7, or 9, may be developed. The term "ground" or "ground connection" when employed in connection with the well circuit refers broadly to the electrode or ground 26 or 83.

I claim as my invention:

1. In an apparatus for identifying and locating the value carrying strata and the non-value carrying strata adjacent to a casing in a drill hole, the combination of means for generating and sending an electrical current through the casing and the adjacent strata, and means for determining the distribution of the current within the drill hole as a function of the depth of the drill hole.

2. In an electrical process for determining the nature of geological formations traversed by a drill hole, the said drill hole being provided with a metallic casing, the step of applying an electrical field through the said formations and determining the distribution of the said electrical field within the drill hole as a function of the depth of the drill hole at points adjacent to the said casing, as a measure of the varying character of the formations traversed by the drill hole.

3. In an electrical process for determining the nature of geological formations traversed by a drill hole, the said drill hole being provided with a metallic casing, the step of transmitting an electrical current from the said casing into the said formations, and determining the distribution of the electrical field resulting from the said current within the drill hole as a function of the depth of the drill hole at points adjacent to the said casing as a measure of the varying character of the formations traversed by the drill hole.

4. Apparatus for determining the location and character of strata penetrated by a bore hole containing a conductive casing comprising means providing a flow of current in the casing and surrounding strata, and means comprising elements movable within the interior of the casing for indicating the flow of current along the casing at various points thereof.

5. The method of determining the location and character of strata penetrated by a bore hole containing a conductive casing comprising providing a flow of current between the casing and a location remote from the casing, and determining by means moving within the casing the flow of current between the casing and surrounding strata at various locations along the length of the casing.

6. The method of determining the location and character of strata penetrated by a bore hole containing a conductive casing comprising providing a flow of current between the casing and a location remote from the casing, and determining by means moving within the casing the flow of current along the casing at various points thereof.

7. Apparatus for determining the location and character of strata penetrated by a bore hole containing a conductive casing comprising means providing a flow of current in the casing and surrounding strata, and means engaging the interior of the casing for indicating the flow of current along the casing at various points thereof.

8. The method of determining the location and character of strata penetrated by a bore hole containing a conductive casing comprising providing a flow of current in the casing and surrounding strata by means of a source one terminal of which is connected to said casing and the other terminal of which is grounded at a location remote from the casing, and lowering within the casing means having conductive contact with the casing to determine the flow of current between the casing and surrounding strata at various locations along the length of the casing.

9. The method of determining the location and character of strata penetrated by a bore hole containing a conductive casing comprising providing a flow of current in the casing and surrounding strata by means of a source one terminal of which is connected to said casing and the other terminal of which is grounded at a location remote from the casing, and lowering within the casing means having conductive contact with the casing to determine the flow of current along the casing at various points thereof.

10. Apparatus for determining the location and character of strata penetrated by a bore hole containing a conductive casing comprising means providing a flow of current in the casing and surrounding strata, said means including a source one terminal of which is connected to said casing and the other terminal of which is grounded at a location remote from the casing, and means for engaging the interior of the casing for indicating the flow of current along the casing at various points thereof.

GEORGE H. ENNIS.